Figure 1:
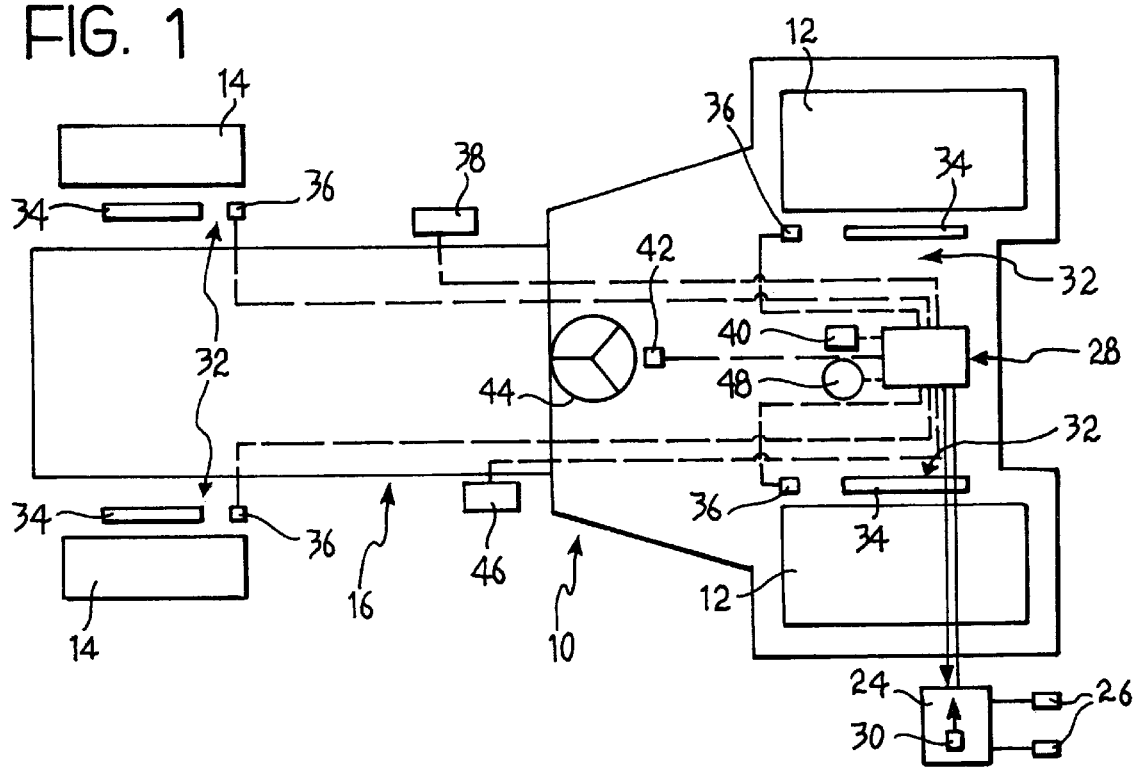

United States Patent

Paggi et al.

[11] Patent Number: 6,059,383
[45] Date of Patent: May 9, 2000

[54] BRAKING CONTROL SYSTEM FOR AGRICULTURAL TRACTORS

[75] Inventors: Bruno Paggi, Treviglio; Massimo Ribaldone, Pontirolo Nuovo, both of Italy

[73] Assignee: Same Deutz-Fahr S.p.A., Treviglio, Italy

[21] Appl. No.: 09/034,148

[22] Filed: Mar. 2, 1998

[30] Foreign Application Priority Data

Mar. 7, 1997 [EP] European Pat. Off. ............. 97830102

[51] Int. Cl.[7] ............................... B60T 8/62; B60T 8/60; B60T 8/66; B60T 8/72; G06F 17/00
[52] U.S. Cl. ................... 303/190; 303/155; 303/167; 303/169; 303/171; 303/189; 701/81; 701/89
[58] Field of Search .................... 303/147, 155, 303/167, 168, 169, 171, 176, 189, 190; 701/81, 89

[56] References Cited

U.S. PATENT DOCUMENTS

| | | | |
|---|---|---|---|
| 4,669,559 | 6/1987 | Fukui | 180/6.24 |
| 4,895,217 | 1/1990 | Hueckler et al. | 180/233 |
| 5,505,267 | 4/1996 | Orbach et al. | 172/3 |
| 5,802,489 | 9/1998 | Orbach et al. | 701/50 |

FOREIGN PATENT DOCUMENTS 4224887  9/1993  Germany.

*Primary Examiner*—Robert J. Oberleitner
*Assistant Examiner*—Jeff Woller
*Attorney, Agent, or Firm*—Charles L. Schwab; Hardway/Mann IP Group

[57] ABSTRACT

A braking control system for agricultural tractors comprises: of the type having a pair of front wheels and a pair of rear wheels with at least one pair being driven through a differential and wherein individual wheel brakes are individually controlled through a hydraulic braking control unit which in turn is controlled by an electronic control unit which causes the braking control unit to apply braking pressure to slow the wheels on the inside of the steering bend in response to signals received by a steering angle sensor.

2 Claims, 2 Drawing Sheets

BRAKING CONTROL SYSTEM FOR AGRICULTURAL TRACTORS

The present invention relates to a braking control system for agricultural tractors.

In conventional tractors, the wheels are connected to the chassis without the interposition of suspension units. In contrast to road vehicles, it is consequently not possible to detect the loads on the axles and it is therefore necessary to use a fixed distribution of braking between the axles of the tractor. Moreover, tractors are subject to very great variations in the loads on the axles; there are situations in which, with tools engaged on the front hoisting device, the maximum load is on the front axle; in other situations, the maximum load bears on the rear axle, for example, when a heavy tool is fitted on the rear hoisting device, leaving the front axle almost completely unloaded.

In this situation, with a fixed distribution of the braking capacity between the front axle and the rear axle, the braking distance cannot be minimized.

On the other hand, the use, on agricultural tractors, of anti-locking systems of the type developed for road vehicles would not be entirely satisfactory. In fact, the particular working conditions of agricultural tractors require from the braking control system more elaborate functions than those of road vehicles ABS systems.

The object of the present invention is to provide a braking control system for agricultural tractors which enables the braking to be distributed correctly on the axles of the tractor preventing the wheels from locking in any load conditions and which, in addition, also assists the operator in carrying out complex operations requiring a precise control of the braking.

According to the present invention, this object is achieved by a braking control system having the characteristics forming the subject of the claims.

Figure 2:
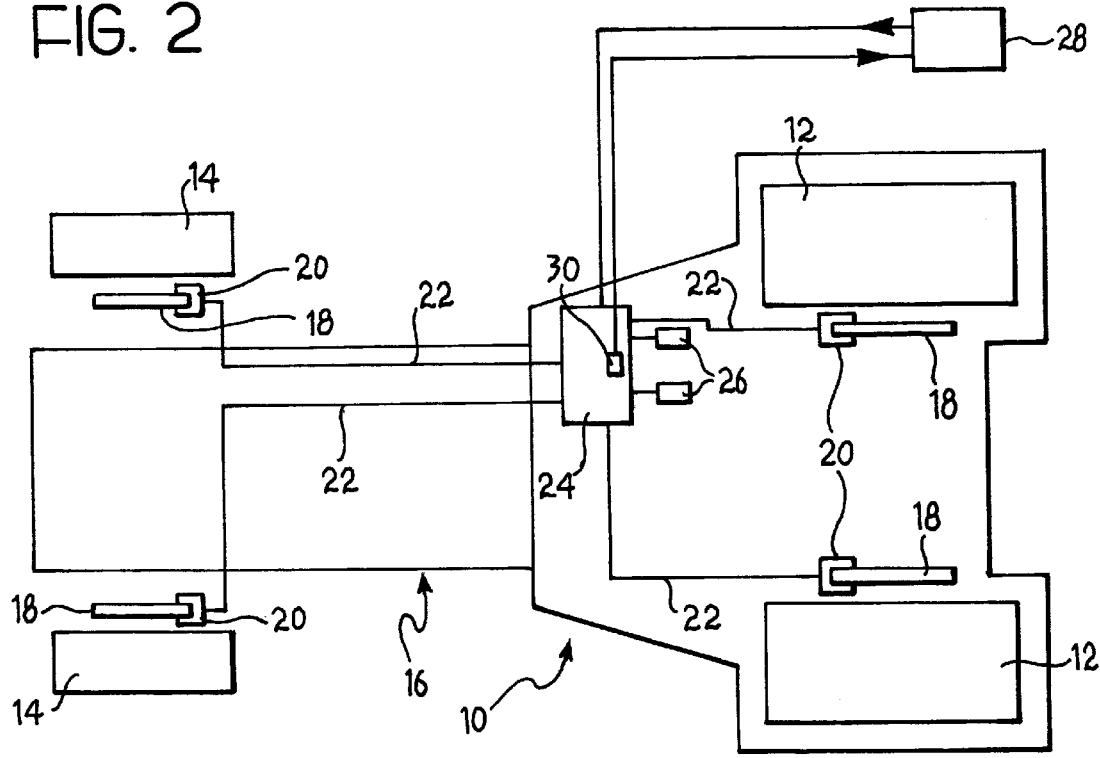
Figure 3:
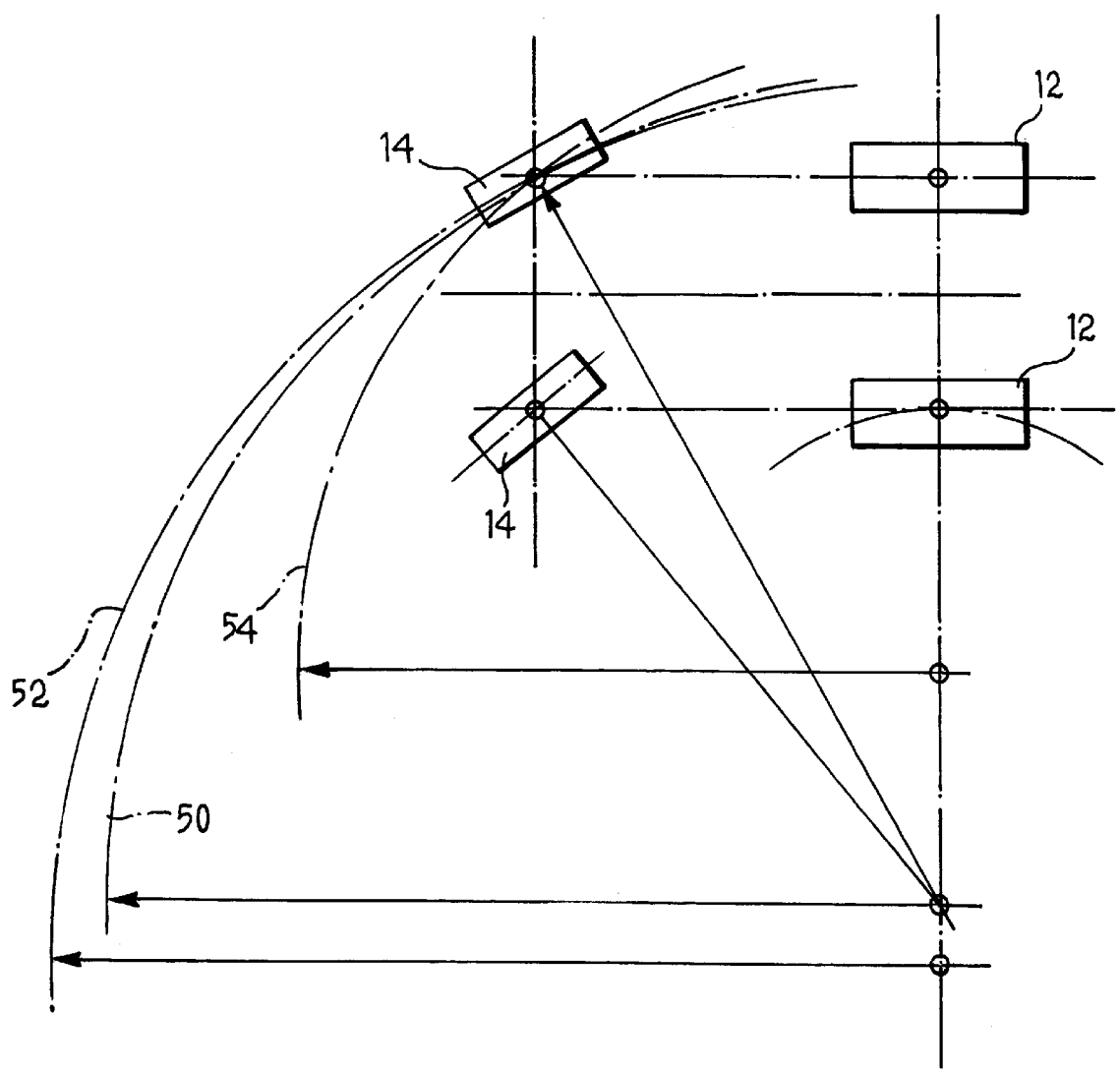

Further characteristics and advantages of the present invention will become clear in the course of the following detailed description, given purely by way of non-limiting example, with reference to the appended drawings, in which:

FIG. 1 is a diagram showing the layout of the electrical-electronic portion of the system according to the present invention, FIG. 2 is a diagram showing the layout of the hydraulic portion of the system according to the invention, and FIG. 3 is a schematic plan view showing the turning behaviour of a tractor provided with a system according to the invention.

With reference to the drawings, an agricultural tractor, schematically indicated 10, has a pair of rear wheels 12 and a pair of front, steering wheels 14. As is normally the case with agricultural tractors, the wheels 12, 14 are connected to the chassis 16 rigidly, that is, without the interposition of suspension units. The tractor 10 may have only rear-wheel drive or may be of the type with four driving wheels. In the latter case, a mechanism is normally provided for setting two- or four-wheel drive.

As shown in FIG. 2, each wheel 12, 14 is associated with a respective brake 18, for example, a disc brake, each of which has a hydraulically-operated actuator 20 which, in the case of disc brakes, is constituted by a calliper. The actuators 20 of the brakes 18 are supplied by respective hydraulic lines 22 which are connected to a hydraulic braking-control unit 24. The hydraulic unit 24 is connected to an operating pedal 26 by means of which the operator can modulate the braking. The pedal 26, as is usual on agricultural tractors, is preferably double to allow the operator to operate the braking of the right- and left-hand wheels independently.

The hydraulic control unit 24 comprises four electro-hydraulic actuators of generally known type (not shown) which enable the braking pressures of the individual wheels 12, 14 to be varied relative to the reference value set by the operator by means of the pedal 26. In particular, the electro-hydraulic actuators enable the braking pressures of the individual wheels 12, 14 to be both increased and decreased independently. The electro-hydraulic actuators of the hydraulic unit 24 are operated by an electronic control unit 28 in accordance with the logic which will be described below. The hydraulic control unit 24 also includes a pressure transducer 30 which gives the control unit 28 a signal indicative of the fact that a braking command has been given.

With reference to FIG. 1, each wheel 12, 14 is associated with a respective speed sensor 32, for example, of the phonic-wheel type. Each speed sensor 32 comprises a toothed wheel 34 fixed to the respective wheel 12, 14 and an electromagnetic transducer 36 facing the wheel 34. The transducers 36 provide the electronic control unit 28 with electrical signals indicative of the instantaneous speeds of rotation of the individual wheels 12, 14.

The braking control system according to the present invention also includes a sensor 38 for providing the control unit 28 with an electrical signal indicative of the speed of the tractor 10 relative to the ground. The sensor 38 may be a radar sensor, for example, of the type with the code C45640-3081B, produced and marketed by the company DICKEY-JOHN. The electronic control unit 28 is preferably associated with a switch 40 which enables the operator to select activation or exclusion of the braking control system.

In addition to the braking control functions which will be described below, the system according to the invention enables the turning radius of the tractor to be controlled and reduced, particularly during manoeuvring in fields. For this purpose, the system is equipped with a steering-angle sensor 42 which is associated, for example, with the steering wheel 44, and which can provide the control unit 28 with data relating to the direction of steering and the amplitude of the steering angle set by the operator by means of the steering wheel 44. In the case of tractors with disengageable four-wheel drive, a sensor 46 which indicates to the control unit 28 whether the tractor is operating with two or four driving wheels is preferably provided. Finally, the system according to the invention may have a switch 48 for setting the type of steering to be put into operation. More precisely, the operator can select, by means of the switch 48, steering with the minimum possible turning radius and with locking of the wheels on the inside of the bend, or steering which takes place with the greatest possible braking of the wheels on the inside of the bend, but without ever achieving locking thereof.

The operation of the system described above will now be explained in detail with reference to the individual functions controlled by the electronic unit 28.

The first basic function of the system according to the invention is that of an anti-locking system with automatic distribution of the braking to the axles of the tractor. It will be assumed that the tractor is moving along the road and that it is necessary to brake hard owing to a dangerous situation. In these conditions, the operator applies a braking force to the pedal 26, activating the braking system. The braking force applied by the operator corresponds to a reference value set for the braking pressure acting on the brakes 18, 20. The pressure transducer 30 supplies to the electronic control unit 28 a signal indicating that the braking system is activated. The control unit 28 then starts to read the speed of each wheel, supplied by the sensors 32. If an axle reaches the locked condition, the electronic unit 28 gives the hydraulic unit 24 a command to reduce the braking pressure to the brakes of that axle. If a single wheel is locked, the control unit 28 reduces the pressure solely of that wheel. The system re-establishes the braking pressure set by the operator as soon as the wheel or axle is released.

The system thus operates like a normal ABS for vehicles, preventing the wheels from locking and maximizing the braking effect, since the coefficient of rolling friction is greater than that for sliding. This takes place regardless of the conditions and distribution of the load on the axles of the tractor. The braking load is thus distributed to the axles of the tractor automatically, owing to the fact that the axle with the greater load withstands a greater braking pressure without locking whereas the less loaded axle tends to lock more easily. This distribution of the braking load is particularly useful in agricultural tractors, given that, since they have no suspension, they cannot have a braking distribution system of the type used for vehicles with suspensions.

A second function of the control system according to the invention is essentially a safety function which makes use of the data coming from the sensor 38 which measures the speed of the tractor 10 relative to the ground.

A first dangerous situation is that in which all of the wheels lock simultaneously. In these conditions, the control unit 28 interprets the message coming from the wheel speed sensors 32 as if the tractor had stopped, whereas, in fact, it is in motion. In these conditions, the data coming from the absolute vehicle-speed sensor 38 enables the control unit 28 to understand that the tractor is moving with all of the wheels locked. In these conditions, the control unit 28 orders the hydraulic unit 24 to reduce the pressure of the entire braking system. A second dangerous situation occurs when the tractor 10 is moving downhill on loose ground. If the operator starts to brake, the wheels tend to lock extremely easily and the control system reduces the braking pressure to prevent the wheels from locking. However, in these conditions, the tractor often maintains its speed rather than slowing down. It has been observed experimentally that, in these conditions, it is more effective to lock the wheels since earth accumulates in front of the wheels, increasing the braking effect. If the electronic control unit 28 receives a signal to start braking from the pressure transducer 30 but does not detect any reduction in speed by means of the sensor 28, it recognizes a dangerous situation and enables the wheels to lock, possibly increasing the braking pressure relative to the reference value set by the operator.

A further function of the braking control system according to the invention is that of reducing the minimum turning radius. Tractors with drive to four wheels normally have four-wheel drive engaged when working in fields. Upon completion of a run, the tractor usually has to turn through 180° in order to start a new one. This operation is normally carried out by steering the front wheels to the maximum possible angle and operating the brake of the inside rear wheel.

The system according to the present invention can be arranged to perform controlled braking of the front and rear wheels which are on the inside of the bend when the steering angle (detected by the sensor 42) exceeds a predetermined reference value. The system optionally carries out this controlled braking of the inside wheels only if the following conditions also occur:

four-wheel drive engaged, and vehicle speed relative to the ground below a predetermined value.

When these conditions occur, the electronic control unit 28 gives the hydraulic unit 24 a command to start the braking of the two inner wheels with reference to the radius of the bend, bringing them to a predetermined speed. The electronic unit 28 progressively reduces the speeds of the wheels on the inside of the bend as the set steering angle gradually increases. It is important to note that the speed of the inside front wheel is independent of that of the inside rear wheel, and their respective braking actions are also independent, given that the system controls both the speed and the braking force for each wheel. Regardless of the load bearing on the axles, the system can thus always ensure the desired speed of the inside wheels.

As already stressed above, it is possible to select by means of the switch 48 whether the steering is to be effected with the maximum turning radius with locked wheels, or whether locking of the wheels on the inside wheels of the bend is to be prevented.

In the first case, when a predetermined steering angle is reached, the system locks the inside wheels. This condition enables the minimum turning radius of the tractor to be achieved. Alternatively, if steering without wheel locking is selected, the system performs the same operation described above but without ever achieving locking of the wheels on the inside of the bend. This option is useful when, for example, manoeuvring on a grassy surface where it is desirable not to tear up the grassy surface by steering with the inside wheels locked.

FIG. 3 shows schematically the steering of a tractor having a system according to the present invention. The turning path indicated 50 represents the kinematic turning radius of the tractor whereas the path indicated 52 (with a radius slightly greater that the kinematic turning radius) represents the minimum turning radius with four-wheel drive engaged. If steering is carried out with the braking control system according to the invention, with control of the speeds of the wheels on the inside of the bend, a decidedly smaller turning radius corresponding to the path schematically indicated 54 is achieved. The greatest advantages of the steering control system according to the invention are achieved with four-wheel drive. In fact, given that each axle has its own differential, the reduction of the speed of the wheel on the inside of the bend automatically involves an increase in the speed of the outside wheel. The increase in the speed of the outside front wheel is particularly useful in reducing the turning radius.

The braking control system according to the present invention thus enables greater safety to be achieved during braking in all road and loading conditions, and allows the braking capacity to be proportioned between the front and rear axles independently, since the system is a braking distributor which distributes the braking force according to need.

In the version with steering control, the system achieves a considerable reduction of the minimum turning radius for operation in the fields and, where necessary, without any damage to the ground during steering, by virtue of the fact that steering without locking of the wheels can be selected. The automatic steering control achieves greater comfort for the operator since, when working in the fields, he does not have to operate the brakes during steering and does not have to pay attention to the type of braking being effected (with or without wheel locking). In fact, steering and braking carried out manually are quite demanding for the operator who is forced to modulate the braking force continuously. Moreover, the rear wheel is difficult to see from the driving position so that, with manual operation, the operator can easily lock the wheel without noticing.

What is claimed is:

1. A braking control system for an agricultural tractor having a manually operated steering apparatus, a pair of front wheels and a pair of rear wheels with at least one of said pairs being driven through a differential, said braking control system comprising:

a hydraulic actuated brake operatively associated with each of said wheels, a hydraulic braking control unit with an individual hydraulic pressure supplying connection to each brake, a brake pedal operatively associated with said hydraulic braking control unit by which a tractor operator establishes a reference value braking pressure, an electronic control unit connected in controlling relation to said hydraulic braking control unit, wheel speed sensor means detecting the speed of each individual wheel and connected to said electronic control unit to deliver electrical signals indicative of the instantaneous rotation speed of each wheel, a steering angle sensing means sensing the steering angle selected by the tractor operator and connected to said electronic control unit to deliver a signal indicative of the steering angle selected by the operator, said electronic control unit causing the hydraulic braking-control unit to supply braking pressure to the wheels on the inside of the bend, when the steering angle exceeds a predetermined value, whereby the speed of the wheels on the inside of the bend depends on the steering angle selected by the tractor operator and said tractor having a two wheel drive mode and a four wheel drive mode and controls permitting the tractor operator to select one of said modes and further including a third sensor means for providing said electronic control unit with an electrical signal indicative of the fact that the tractor is operating in four-wheel drive, and wherein said electronic control unit causes braking of the wheels on the inside of the bend only when the tractor is operating in four-wheel drive.

2. A braking control system for an agricultural tractor having a manually operated steering apparatus, a pair of front wheels and a pair of rear wheels with at least one of said pairs being driven through a differential, said braking control system comprising:

a hydraulically actuated brake operatively associated with each of said wheels, a hydraulic braking control unit with an individual hydraulic pressure supplying connection to each brake, a brake pedal operatively associated with said hydraulic braking control unit by which a tractor operator establishes a reference value braking pressure, an electronic control unit connected in controlling relation to said hydraulic braking control unit, wheel speed sensor means detecting the speed of each individual wheel and connected to said electronic control unit to deliver electrical signals indicative of the instantaneous rotation speed of each wheel, a steering angle sensing means sensing the steering angle selected by the tractor operator and connected to said electronic control unit to deliver a signal indicative of the steering angle selected by the operator, said electronic control unit causing the hydraulic braking-control unit to supply braking pressure to the wheels on the inside of the bend, when the steering angle exceeds a predetermined value, whereby the speed of the wheels on the inside of the bend depends on the steering angle selected by the tractor operator and a steering-type selection device having a first and second working positions which can be set by the operator, in the first working position, the control unit being operative to reduce the speeds of the wheels on the inside of the bend progressively until they lock when a predetermined steering angle is reached and, in the second working position, the control unit being operative to reduce the speeds of rotation of the wheels on the inside of the bend progressively until incipient locking conditions are reached.

* * * * *